US007825923B2

(12) United States Patent
Fenney et al.

(10) Patent No.: US 7,825,923 B2
(45) Date of Patent: Nov. 2, 2010

(54) FULL SCREEN ANTI-ALIASING WITH DYNAMIC FILTERS

(75) Inventors: Simon James Fenney, St. Albans (GB); Alex Joseph William Walters, Apsley (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 330 days.

(21) Appl. No.: 11/386,329

(22) Filed: Mar. 22, 2006

(65) Prior Publication Data

US 2007/0097140 A1 May 3, 2007

(30) Foreign Application Priority Data

Oct. 28, 2005 (GB) ................... 0522072.8

(51) Int. Cl.
 *G06T 15/00* (2006.01)
(52) U.S. Cl. .................. 345/419; 345/421; 345/613; 711/6; 711/104
(58) Field of Classification Search ................ 345/419, 345/421, 509, 611, 612, 613; 711/1, 6, 100, 711/104
 See application file for complete search history.

(56) References Cited

U.S. PATENT DOCUMENTS 6,002,411 A * 12/1999 Dye ............................ 345/542
6,188,394 B1    2/2001 Morein et al.
6,700,672 B1 *  3/2004 Jones et al. ................... 358/1.1
6,917,369 B2 *  7/2005 Perry et al. .................. 345/589
6,956,582 B2 * 10/2005 Tidwell ....................... 345/611
6,999,100 B1 *  2/2006 Leather et al. ............... 345/611
7,061,507 B1 *  6/2006 Tuomi et al. ................. 345/611
7,123,271 B2 * 10/2006 Perry et al. .................. 345/611
7,167,175 B2 *  1/2007 Keller ......................... 345/426
7,176,926 B2 *  2/2007 Frisken et al. ............... 345/473
7,589,729 B2 *  9/2009 Skibak et al. ............... 345/441

FOREIGN PATENT DOCUMENTS

JP          7-231449        8/1995

OTHER PUBLICATIONS

"*Winscale*: An Image-Scaling Algorithm Using an Area Pixel Model", Chun-Ho Kim, Si-Mun Seong, Jin-Aeon Lee, and Lee-Sup Kim, IEEE Transactions on Circuits and Systems for Video Technology, vol. 13, No. 6, Jun. 2003 (7 sheets).

* cited by examiner

*Primary Examiner*—Phu Nguyen
(74) *Attorney, Agent, or Firm*—Flynn, Thiel, Boutell & Tanis, P.C.

(57) ABSTRACT

A method and apparatus for improving the quality of a computer-generated image including a number of different objects. The apparatus includes a graphics display system which identifies objects to be rendered into a graphic display at either ones to which anti-aliasing is to be applied, or ones to which anti-aliasing is not to be applied.

20 Claims, 4 Drawing Sheets

400% enlargement showing the bluring round the cursor and text

A 400% Enlargement of the same area as shown in Figure 2 clearly showing the improved clarity of the lines.

FULL SCREEN ANTI-ALIASING WITH DYNAMIC FILTERS

BACKGROUND TO THE INVENTION

This invention relates to a method and apparatus for performing anti-aliasing on images and, in particular, on computer graphic images rendering in either three dimensions or two dimensions.

When scenes are rendered in a computer graphics system in either 3D or 2D, the quality of the images can often be improved, especially around the edges of objects. The nature of computer images means that they are usually derived by taking discrete samples of data across a rectilinear grid. This can introduce aliasing artifacts into the scene at edges of objects, therefore leaving boundary lines with jagged or staircase edges. This is a well-known problem and many methods have been proposed to anti-alias lines usually by altering the contribution a line or edge makes to a pixel based on the amount of that pixel which it covers. For computer-generated images, anti-aliasing is usually performed during the image's conversion from a vector-based representation to a raster-based image, or directly from the rasterised presentation.

Pre-filtering of objects usually gives the best anti-aliasing results but can be expensive to achieve. Therefore, in many real time graphics applications, post filtering in the form of super-sampling and multi-sampling is usually used. This enables all the anti-aliasing required to be achieved in a single pass of a filter, although the results it produces are not always of such high quality as can be obtained by pre-filtering. It is, however, far less expensive to implement.

The anti-aliasing results produced by super-sampling techniques have been found to improve with higher sampling rates but at the cost of additional computer power and additional memory. These increase significantly since a 2×2 super-sampling array can require four times as much memory and computation effort as a system with no super-sampling. A system with 4×4 super-sampling can take sixteen times as much computation and memory requirements.

As a result, many variations using different filters and patterns have been devised to give better results using smaller sample sizes. Such patterns include grid, rotated grid and stochastic sampling.

In any super-sampling system, the down sampling filter that is chosen represents a trade-off between the desired elimination of aliasing, the over-filtering of the image which may result in blurring, and the implementation cost. The choice is usually a compromise between an acceptable amount of aliasing and image blurring. In some systems, down filtering can be performed 'on the fly' as part of the display sub-system. If this is achieved then there is no need for a physical buffer to store the target resolution anti-aliased image. Systems such as these are preferably used as they can reduce the memory bandwidth requirements in real time rendering applications.

When super-sampling is performed on a graphic scene, the result is that the whole scene may become slightly blurred as a result of the filtering which takes place. This softens any hard-edged lines that are present. For most 3D or 2D animated graphics this is not a problem and usually is desirable. However, it can be a problem when rendering user interface elements such as "head-up display" parts of an image where the user expects to see crisp anti-aliased edges. For example, borders of windows and menus and specially created fonts are usually expected to have well-defined crisp edges. An example of the effects of super-sampling on a menu window is shown in FIGS. 2A and B. In this, it can be seen that the text within the menu and the cursor do not have the expected degree of sharpness associated with menu displays. Enlargement of the menu portion of the image at FIG. 2B shows the blurring effect. One way of dealing with this effect on menu displays is to render the user interface elements such as the menu at FIG. 2 into a separate buffer. Thus a different anti-aliasing technique is then used which maintains sharpness. This portion of the image can then be copied pixel by pixel onto the anti-alias three-dimensional or two-dimensional image.

It will be appreciated that such a solution incurs additional cost in the use of the additional memory buffer, the computational cost of copying the data across, and the synchronisation required between the two systems. This synchronisation problem is even more of an issue with systems that perform super-sampling filtering in real time in a display sub system.

SUMMARY OF THE INVENTION

In accordance with an embodiment of the present invention there is provided a graphics display system including means to identify objects to be rendered into a graphic display as either ones to which anti-aliasing is to be applied or ones to which anti-aliasing is not to be applied. Preferably, there are additional sets of flags, with one flag (or flags) per target resolution pixel.

In a preferred embodiment, items are drawn into a super-sampling (or, alternatively, a multi-sampling) buffer to which a down-sample filtering will later be applied. At the same time, the system tags pixels using an anti-aliasing flag buffer, thereby allowing the system to identify those regions which are to be anti-aliased and those in which sharpness such as menu/window vertical and horizontal lines is to be maintained.

Once the super-sampling buffer has been filled, the down sampling process occurs. At each stage, the anti-aliasing flag buffer is used to dynamically change the applied filter; in the preferred embodiment, between an anti-aliasing filter and a filter that preserves sharpness.

BRIEF DESCRIPTION OF THE DRAWINGS

Preferred embodiments of the invention will now be described in detail by way of reference to the accompanying drawings in which.

DETAILED DESCRIPTION OF PREFERRED EMBODIMENTS

Figure 1:
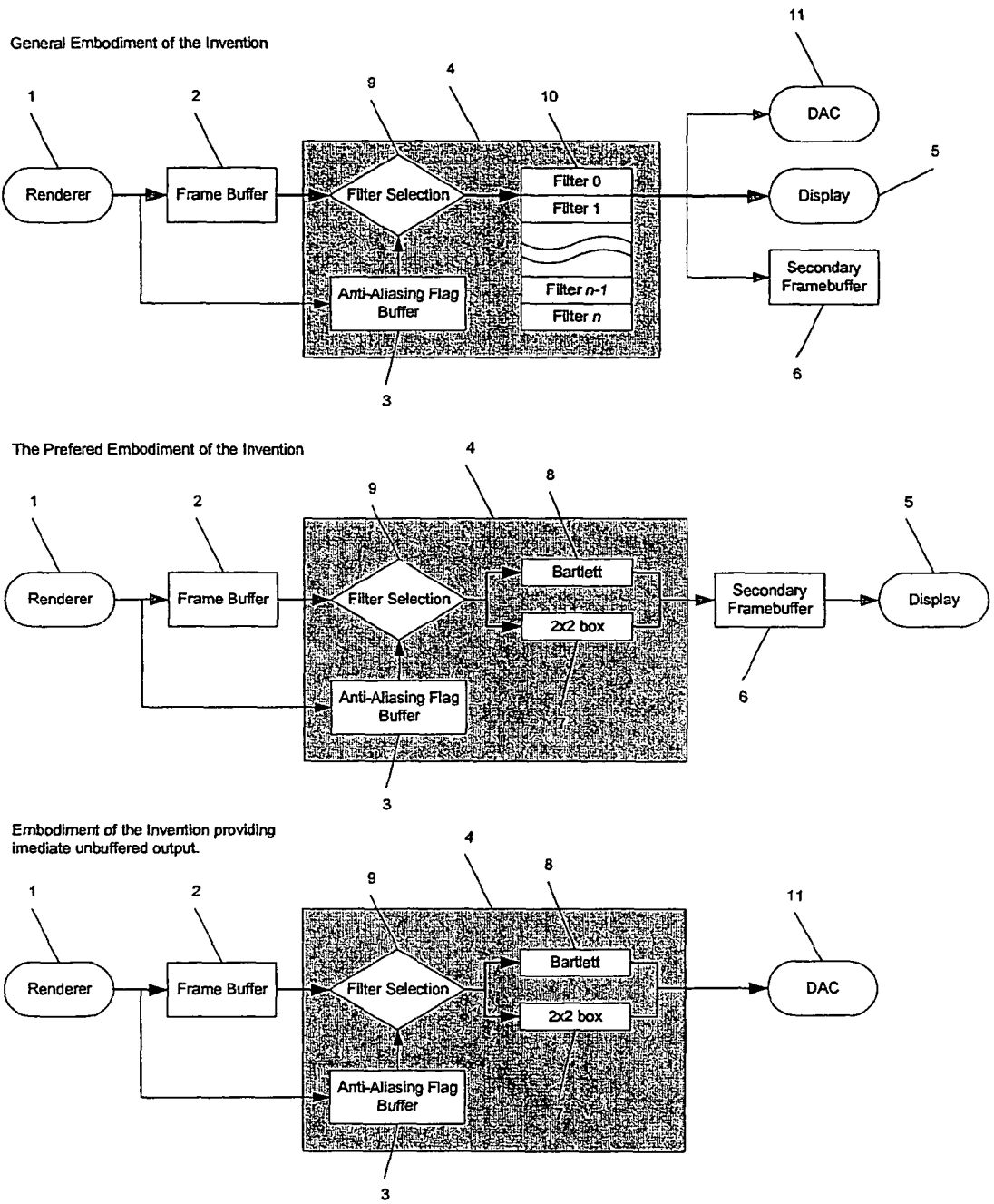
FIG. 1 shows 3 block diagrams illustrating an apparatus embodying the invention.
Figure 2:
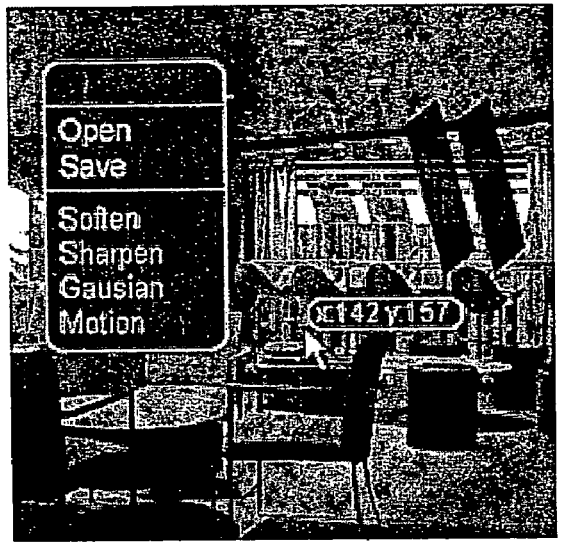
FIG. 2 shows a sample and graphics scene with overlay interface items, as described above.
Figure 2:
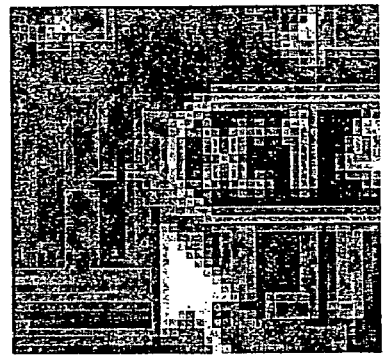
Figure 3:
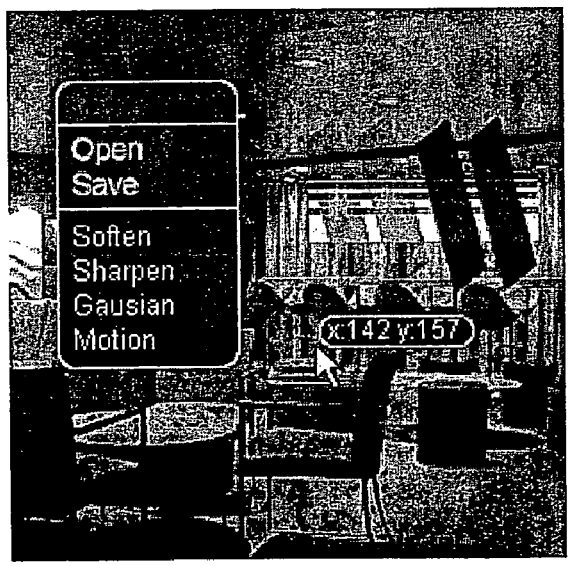
FIG. 3 shows the same scene as FIG. 1 to which an embodiment of the invention has been applied.
Figure 3:
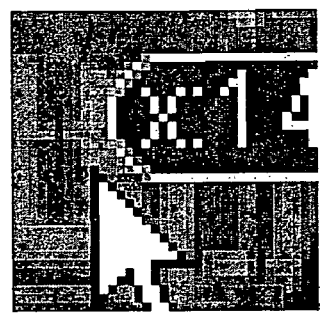

The diagrams of FIG. 1 a), b) and c) shows schematically how the invention may be embodied for use in 2D or 3D computer-generated images. It operates as follows:

A renderer 1 writes object data to a frame buffer 2. The renderer 1 can be a 3D graphics engine that is repeatedly rendering objects to the frame buffer, possibly in real time. In this case it will include all the hidden surface removal and texturing and shading circuitry required. It can also comprise or include means for generating graphic overlay objects such as those shown in FIG. 2 to be super-imposed on an image.

As each pixel is written to the frame buffer 2, the object generator 1 also generates an anti-aliasing flag, which it sends to an anti-aliasing flag buffer 3. This anti-aliasing flag buffer comprises in this embodiment a single bit for each pixel (at target image resolution), which can then be used to determine whether or not anti-aliasing, or other functions are applied to the pixel in question.

A filter unit 4 creates the target resolution image, on a per pixel basis, using the information in the anti-aliasing flag buffer 3 and the pixels in the frame buffer 2. For each pixel the anti-aliasing flag is read by a filter selection unit 9 and depending on the flag's value a filter is chosen from filter store 10 to produce the output pixel. A group of pixels is then read from the frame buffer 2, passed through the filter unit, thus producing a single colour value for the target pixel, which is then sent straight to the display device output 5. Instead of immediately outputting pixels they could be stored into a secondary frame store 6 or sent to another output or buffering device 11. In FIG. 1a) the filter unit 10 includes different filters, any one of which may be selected in dependence on the value of the flag for that pixel.

In the preferred embodiment (FIG. 1b), a group of pixels read from the frame buffer 2 can be either a 2×2 block, or a 4×4 block, to be passed through the filter selector 9 as input to one of a collection of filters 10; encompassing in the preferred embodiment, the 2×2 box filter 7 and the 4×4 Bartlett filter 8 respectively. The box filter 7 has a narrower base and does not blur the line edges whereas the Bartlett filter 8 has a wider base and removes more aliasing artefacts but also slightly blurs the image. This permits sharp interface items and anti-aliased scenes to be rendered at the same time, thus removing the need to render the anti-aliased scene to an intermediate buffer, perform filtering upon it, and then compose the non anti-aliased items onto the image.

When the input scene data is input to the frame buffer 2, it is preferably super-sampled at a 2×2 resolution. It is, however, a trivial step to alter the sampling rate. For example, if an alternate 4×4 super-sampling rate were used, an output image of 256×256 pixels would require an input sampling of 1024× 1024 pixels but the anti-aliasing flag buffer would still only require one bit per output pixel (i.e. 256×256). When the object generator 2 produces this image, a flag is set depending on whether the line is to be sharp or anti-aliased. This state is then recorded into the anti-aliasing flag buffer 3 at the same time as the pixel is written to the frame buffer 2. We can consider pixels which are intended to be sharp to be referred to as "marked" and pixels intending to be anti-aliased as "unmarked", these two states corresponding to the set and unset states of the anti-aliasing flag.

An image that is to be constructed from overlapping lines needs to have some rules to determine whether or not a pixel is marked. When opaque lines are being rendered then the step of overwriting the pixel status is sufficient to deal with this. However, when transparent objects are in use, the user needs to have some control over the rules for marking pixels. Therefore, the anti-aliasing flag can be set in a number of possible ways, or update modes, as follows:

1. Set anti-aliasing: this sets the current pixel in the anti-aliasing flag buffer to anti-alias;

2. Set non anti-aliasing: this sets the current pixel to be non anti-aliased;

3. Preserve anti-aliasing: if the pixel is already set as requiring anti-aliasing, it should be left in this state, otherwise it would be overwritten; and 4. Preserve non anti-aliasing: this would leave a pixel as set to non anti-aliasing if that is its current setting.

Figure 4:
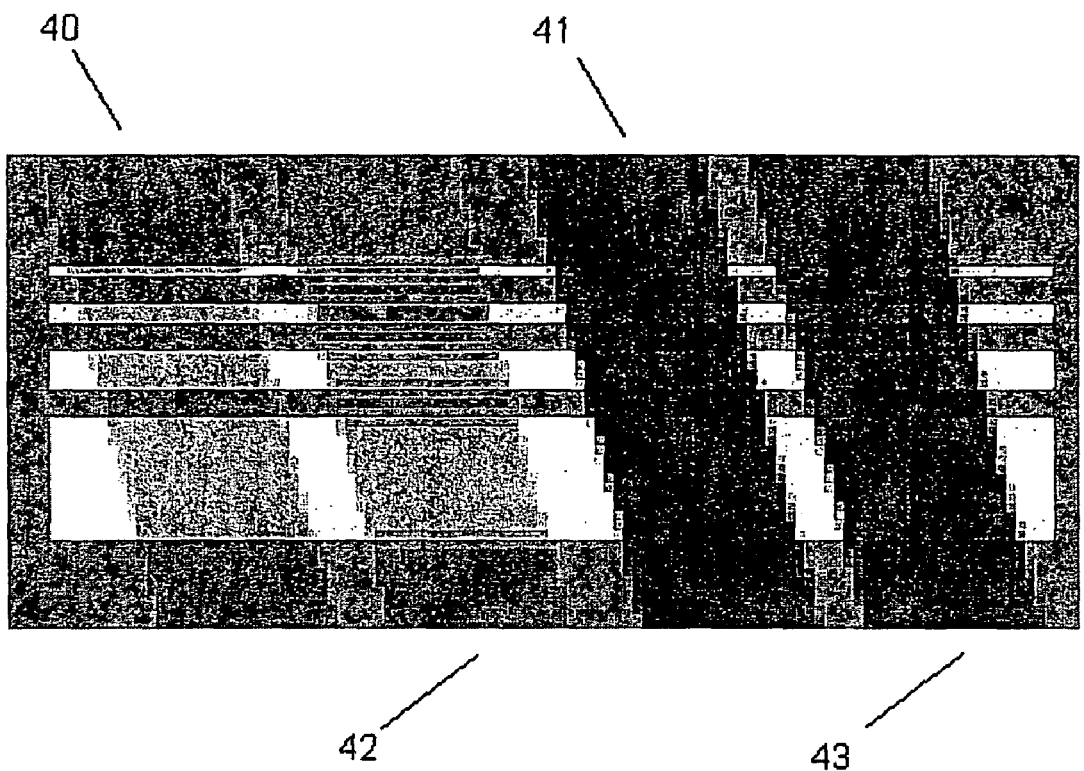
FIG. 4 illustrates the rendering of semi-opaque lines using different anti-aliasing flags.

The effects of these different rules are shown in the diagram of FIG. 4. In this, the horizontal lines are rendered with the set non anti-aliasing rule. There are then four lines of varying opacity rendered over the top of these lines and these are to be anti-aliased. The four lines of varying opacity over the top of the horizontal lines are rendered into the frame buffer using the set anti-aliasing rule and preserve anti-aliasing rule. The results of these are shown in different portions of FIG. 4. The preserve anti-aliasing rule is applied to lines 40 and 41 and causes the underlying lines to remain sharp, whilst the set anti-aliasing rule is applied at 42 and 43 and causes the interior of the overlaid lines to be fully anti-aliased, softening the opaque lines underneath.

The next step is the image filtering which occurs when the image data is read from the frame buffer 4. The effect of this can be seen in FIG. 5.

In the example, we show a 2×2 super-sampling filter and a 4×4 Bartlett filter. The 2×2 box filter is used for marked pixels, i.e. those pixels where the sharpness of lines is to be maintained and a 4×4 Bartlett filter is to be used for unmarked pixels that are to be anti-aliased.

Figure 5:
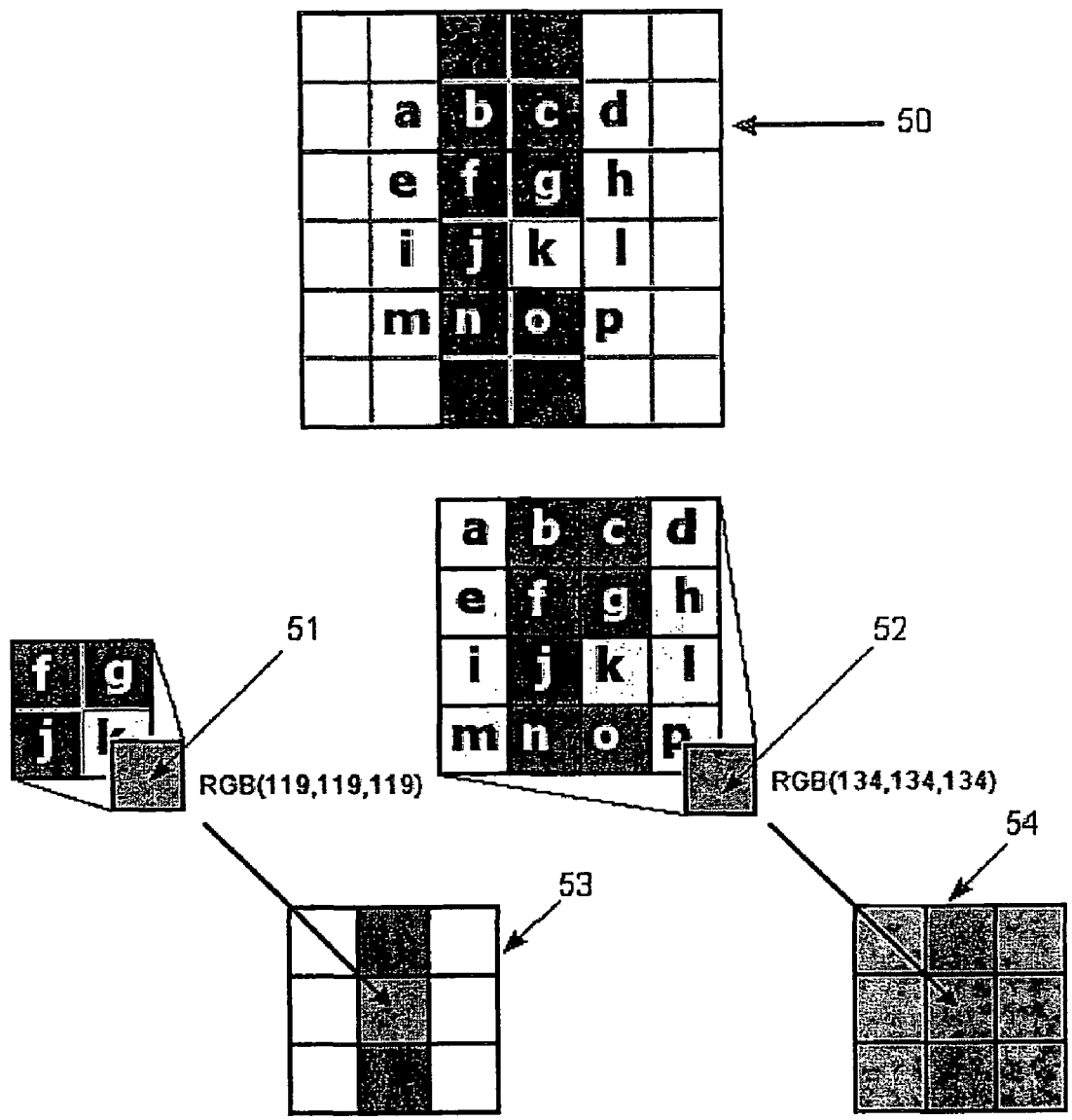
FIG. 5 shows the application of box and Bartlett filters to a sample image.

In FIG. 5, an image containing a vertical line with a single pixel lighter than the others is shown at 50. 51 and 52 then illustrate respectively the effects of the different types of filtering required to calculate the central elements of the image.

The first filter is the 2×2 box filter, which is applied to the image data at 51 and produces the output 53. The second is the Bartlett filter, which is applied to the image at 52 and produces the output at 54. Because the Bartlett filter has a wider base, and uses a larger group of pixels to determine the fragment colour, the output value in this case is of a lighter colour than the pixel generated by the box filter. Also the adjacent pixels that are white in the box-filtered image inherit colour from the neighbouring black pixels.

Because the anti-aliasing filter is wider than the single pixel block, it will encounter problems when filtering up to the edges of the image or filtering a pixel block adjacent to a marked pixel (i.e. one which cannot be anti-aliased). If the algorithm is applied to a textured image that is tiled, for the purposes of image processing, the filter can wrap around the edge. However, this does not counter the problem of marked pixels being included.

One embodiment omits pixels that are marked from the filter and divides the accumulated pixel combination at the end by the sum of the weights used. This has been found to give good results but requires a more complicated set of hardware with a full divider.

A less-complicated but still useful solution duplicates colour values from the closest centre sub pixels to those sub pixels that are outside the edges of the original pixels which would have been marked, this preserves the relative colour of the pixel and allows the use of shifts since the Bartlett filter weights accumulate to a power of 2.

In an alternative embodiment, the filter used for the anti-aliasing can be replaced with a filter with a wider base or different distribution. In other embodiments the amount of super-sampling can be changed. This would then require larger filters to be used in addition to the extra memory requirements.

In yet another embodiment, sharp image data filters can also be replaced with low degree filtering or edge enhancing filtering.

Still another embodiment may have a choice of more than two filters. However, this would require an increase in the bit width of the anti-aliasing flag buffer and will introduce additional drawing rules for updating the buffer.

As a further alternative, dynamic filtering can be performed with the immediate output display sub system as shown in the third embodiment in FIG. 1. This will ensure that the low-resolution image is never written to memory and is passed directly to the output device.

The behaviour of the flag buffer could be extended to provide per pixel control for functions other than super-sampling behaviours. Such functions could include enabling fine control over dithering for when rendering is performed on low colour depth devices. Normally the computed colour value could be subjected to dithering in the down sample process, whereas such an extension would enable indicated areas to inherit a solid colour.

The invention claimed is:

1. A method for improving the quality of a computer-generated image comprising a number of different objects, the method comprising the steps of:
    for each pixel in an image, generating a flag in dependence on the objects rendered at that pixel and on the filtering required by that pixel;
    storing the flag in a flag store;
    reading flag data from the flag store;
    selecting at least one filter to apply to a set of supersampled input pixels to generate an output pixel in dependence on the read flag data;
    applying the at least one filter to the supersampled input pixels to generate the output pixel; and
    supplying the output pixel for display.

2. The method according to claim 1 in which the flag comprises a single bit per pixel.

3. The method according to claim 1 in which the flag comprises a plurality of bits per pixel.

4. The method according to claim 1 in which the at least one filter is a box filter.

5. The method according to claim 1 in which the at least one filter is a Bartlett filter.

6. The method according to claim 1 in which the output pixel is stored in a secondary framestore.

7. The method according to claim 1 in which the step of generating the flag does so in dependence on the object visible at that pixel.

8. The method according to claim 1, in which the at least one filter is a box filter and a Bartlett filter.

9. The method according to claim 1, in which the at least one filter is selected from a filter unit containing different filters.

10. An apparatus for improving the quality of a computer-generated image comprising a number of different objects, comprising:
    means for generating for each pixel in an image a flag in dependence on the objects rendered at that pixel and on the filtering required by that pixel;
    a flag store for the image;
    means for retrieving flag data from the flag store;
    means for selecting at least one filter to apply to a set of supersampled input pixels to generate an output pixel in dependence on the flag data;
    means for applying the at least one filter to the pixel; and
    means for supplying the thus filtered pixel for display.

11. The apparatus according to claim 10 in which the flag comprises a single bit per pixel.

12. The apparatus according to claim 10 in which the flag comprises a plurality of bits per pixel.

13. The apparatus according to claim 10 in which the at least one filter is a box filter.

14. The apparatus according to claim 10 in which the at least one filter is a Bartlett filter.

15. The apparatus according to claim 10 including a secondary frame store for storing the filtered pixels.

16. The apparatus according to claim 10 in which the means for generating the flag does so in dependence on an object visible at that pixel.

17. The apparatus according to claim 10, in which the at least one filter is a box filter and a Bartlett filter.

18. The apparatus according to claim 10, additionally comprising a filter unit containing different filters.

19. A method for improving the quality of a computer-generated image comprising a number of different objects, the method comprising the steps of:
    writing object data to a frame buffer for each pixel contained in an image;
    generating anti-aliasing flag data in dependence on the object data in each pixel;
    sending the anti-aliasing flag data to an anti-aliasing flag buffer;
    reading the anti-aliasing flag data for each pixel and selecting a filter in dependence on the anti-aliasing flag data;
    applying the selected filter to a set of supersampled input pixels to generate an output pixel; and
    supplying the output pixel to display.

20. An apparatus for improving the quality of a computer-generated image comprising a number of different objects, comprising:
    means for writing object data to a frame buffer for each pixel contained in an image;
    means for generating anti-aliasing flag data in dependence on the object data in each pixel;
    means for sending the anti-aliasing flag data to an anti-aliasing flag buffer;
    means for reading the anti-aliasing flag data for each pixel and selecting a filter in dependence on the anti-aliasing flag data;
    means for applying the selected filter to a set of super-sampled input pixels to generate an output pixel; and
    means for supplying the output pixel to display.

* * * * *